(12) United States Patent
Villacres Mesias

(10) Patent No.: US 10,414,348 B2
(45) Date of Patent: Sep. 17, 2019

(54) ANTI-ROCKING BRACKET FOR VEHICLE PILLAR TRIM

(71) Applicant: FORD GLOBAL TECHNOLOGIES, LLC, Dearborn, MI (US)

(72) Inventor: Diego Fabricio Villacres Mesias, San Mateo Atenco (MX)

(73) Assignee: Ford Global Technologies LLC, Dearborn, MI (US)

( * ) Notice: Subject to any disclaimer, the term of this patent is extended or adjusted under 35 U.S.C. 154(b) by 288 days.

(21) Appl. No.: 15/343,301

(22) Filed: Nov. 4, 2016

(65) Prior Publication Data

US 2018/0126925 A1 May 10, 2018

(51) Int. Cl.
*B60R 13/02* (2006.01)
(52) U.S. Cl.
CPC ........ *B60R 13/0206* (2013.01); *B60R 13/025* (2013.01)
(58) Field of Classification Search
CPC .................. B60R 13/0206; B60R 13/025
USPC .................................................... 296/193.06
See application file for complete search history.

(56) References Cited

U.S. PATENT DOCUMENTS

| 5,741,044 A * | 4/1998 | Kawai ................ B60R 13/0206 296/187.05 |
| 5,791,716 A | 8/1998 | Takagi et al. |
| 5,992,914 A * | 11/1999 | Gotoh ................ B60R 13/0206 280/751 |
| 6,832,800 B2 | 12/2004 | Hwang |
| 8,011,709 B2 | 9/2011 | Senakiewich, II et al. |
| 9,670,947 B2 * | 6/2017 | Bachelder ........... B60R 13/0206 |
| 2008/0289154 A1 * | 11/2008 | Guerlin ................ B60R 13/025 24/289 |

(Continued)

FOREIGN PATENT DOCUMENTS

| CN | 203005303 U | 6/2013 |
| CN | 203438951 U | 2/2014 |

(Continued)

OTHER PUBLICATIONS

English Machine Translation of CN203005303U, Jun. 19, 2013.
English Machine Translation of CN203438951U, Feb. 19, 2014.

*Primary Examiner* — Hilary L Gutman
(74) *Attorney, Agent, or Firm* — Vichit Chea; King & Schickli PLLC

(57) ABSTRACT

A vehicle pillar trim piece bracket includes a body carrying a panel- or flange-engaging portion held in a first plane and a trim piece stand-off portion held in a second plane that is different from the first plane. In combination, the body, the panel- or flange-engaging portion, and the trim piece stand-off portion may define a three-dimensional L shape. The body includes an elongated positioning wall and a fore-aft positioning rib disposed on a first end and one or more up-down control fingers disposed on a second, opposed end. The trim piece stand-off portion includes a neck and a pillar trim piece-supporting head which includes one or more vertical rotation controlling ribs and an edge configured to matingly abut a pillar trim structural feature. The panel- or flange-engaging portion includes a plurality of staggered fingers and a plurality of offset tunable ribs disposed to define an interference-fit panel receiver.

8 Claims, 4 Drawing Sheets

(56) References Cited

U.S. PATENT DOCUMENTS

| | | | | |
|---|---|---|---|---|
| 2012/0045608 A1* | 2/2012 | Huchet | ............... | B60R 13/0206 |
| | | | | 428/99 |
| 2012/0068488 A1* | 3/2012 | Mourou | ............. | B60R 13/0206 |
| | | | | 296/1.08 |
| 2012/0274094 A1* | 11/2012 | Mazur | ................ | B60R 13/0206 |
| | | | | 296/146.7 |
| 2013/0205546 A1* | 8/2013 | Vemulapati | ......... | B60R 13/0206 |
| | | | | 24/289 |
| 2016/0068116 A1* | 3/2016 | Inagawa | ............... | B60R 21/213 |
| | | | | 296/193.06 |

FOREIGN PATENT DOCUMENTS

| | | | | | |
|---|---|---|---|---|---|
| EP | | 1798112 | A2 * | 6/2007 | ......... B29C 45/1671 |
| FR | | 2898562 | A1 * | 9/2007 | ........... B60R 13/025 |
| FR | | 2938026 | A1 * | 5/2010 | ......... B60R 13/0206 |
| WO | WO-2007036664 | A1 * | 4/2007 | ........... B60R 13/025 |
| WO | WO-2009002688 | A1 * | 12/2008 | ......... B60R 13/0206 |

* cited by examiner

US 10,414,348 B2

ANTI-ROCKING BRACKET FOR VEHICLE PILLAR TRIM

TECHNICAL FIELD

This disclosure relates generally to motor vehicle pillars and to trim pieces therefor. More particularly, the disclosure relates to a pillar bracket configured for attachment to pillar trim pieces to prevent or reduce trim rocking and rotation.

BACKGROUND

As part of final vehicle assembly, different styles and configurations of interior trim elements are attached to portions of a vehicle, for example to an inner surface of the passenger cabin doors, to an A-pillar passenger cabin-facing surface, and others. Such trim elements hide unattractive interior workings of vehicle components, and present an attractive and finished appearance to the consumer.

Certain pillar trim pieces, for example A-pillar upper trim pieces, have portions that are substantially unconstrained due to their geometry and therefore prone to deflection events such as rocking and rotation. This is conventionally addressed by modifying the attachment scheme of the trim part or by adding stand-off features molded in the trim part.

However, in certain vehicles the disposition of surrounding components and/or the trim piece-to-sheet-metal distance does not admit of in-molded stand-off features that prevent rocking/rotation of all portions of a vehicle trim piece. In such situations, all degrees of freedom of movement of the trim piece may not be constrained, affecting consumer perception of part quality.

This is illustrated in FIG. 1, showing a portion of a vehicle 100 including an A-pillar 110 and a section of an A-pillar upper trim piece 120. As shown, even when a molded-in stand-off feature 130 is included in the A-pillar upper trim piece 120, a portion 140 of the upper trim piece 120 is unconstrained, and may potentially rock or rotate.

This rocking/rotation of the trim piece is exacerbated in conditions of high temperature such as are often encountered in a vehicle interior when the heating, ventilation, and air-conditioning (HVAC) system is not operating. This is because the materials often used for trim components lose structural rigidity under such conditions. Such trim components will rock/rotate more under such conditions (compared to room temperature) even at application of a same torque value.

Thus, a need is identified in the art for structures to reduce or eliminate such pillar trim piece rocking/rotation.

SUMMARY

In accordance with the purposes and benefits described herein and to solve the above-summarized and other problems, in one aspect a vehicle pillar trim piece bracket is provided, comprising a body carrying a panel- or flange-engaging portion held in a first plane and a trim piece stand-off portion held in a second plane that is different from the first plane. In combination, the body, the panel- or flange-engaging portion, and the trim piece stand-off portion define a three-dimensional L shape. The panel- or flange-engaging portion comprises a plurality of staggered fingers disposed to define an interference-fit panel receiver therebetween. Some or all of the staggered fingers may include tunable ribs dictating a snugness of the interference fit created. In embodiments, the plurality of staggered fingers each define an arcuate cross-section.

In embodiments, the body comprises an elongated positioning wall and a fore-aft positioning rib disposed on a first end and one or more up-down control fingers disposed on a second, opposed end.

The trim piece stand-off portion comprises a neck and a pillar trim piece-supporting head. In embodiments, the pillar trim piece-supporting head comprises a pillar trim piece-supporting surface comprising one or more vertical rotation controlling ribs and an edge configured to matingly abut a pillar trim structural feature.

In other aspects, vehicle pillar and trim assemblies are provided comprising pillar, a pillar trim piece, and a pillar trim piece bracket as described herein. In embodiments the pillar may be an A-pillar.

In the following description, there are shown and described embodiments of the disclosed motor vehicle trim bracket. As it should be realized, the trim bracket is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed pillar trim bracket, and together with the description serve to explain certain principles thereof. In the drawing.

Reference will now be made in detail to embodiments of the disclosed pillar trim bracket, examples of which are illustrated in the accompanying drawing figures wherein like reference numerals indicate like features.

DETAILED DESCRIPTION

Figure 1:
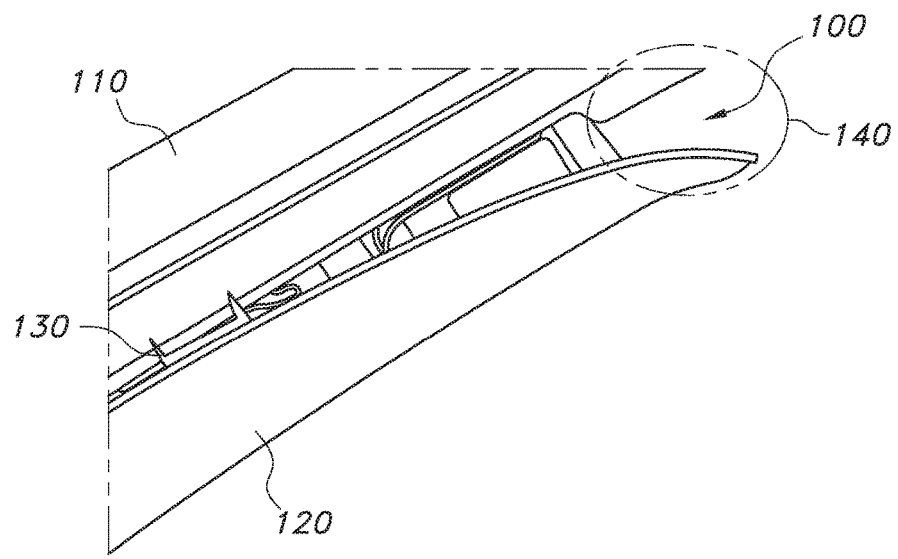
FIG. 1 shows a prior art A-pillar upper trim piece installed on a vehicle.

As background, a motor vehicle includes one or more pillars (sometimes referred to as posts) which provide structural support to various portions of the passenger compartment. As is known, pillars are the vertical or semi-vertical supports of a vehicle's window area or "greenhouse." These pillars are by convention identified according to their placement beginning at a juncture of the engine compartment and the passenger compartment, and are numbered or lettered sequentially proceeding towards a rear of the vehicle. Thus, the pillars disposed at either side of the vehicle front windscreen are the A pillars (see FIG. 1). The pillars extending between the passenger compartment roof to the floor are the B pillars. The pillars disposed at a rear of the vehicle rear door are the C pillars. In longer vehicles such as station wagons, SUVs, limousines, etc. D pillars may be provided. Still more, vehicles with additional doors may be provided with more than one pair of B pillars, designated B1, B2, etc.

The vehicle pillars are typically overlaid with one or more trim pieces, which hide pillar and roof materials, and also any wiring or cabling routed along the pillar. As summarized above, certain portions of the pillar trim may be at least partially unconstrained due to their geometry and therefore prone to deflection events such as rocking and rotation.

Figure 2:
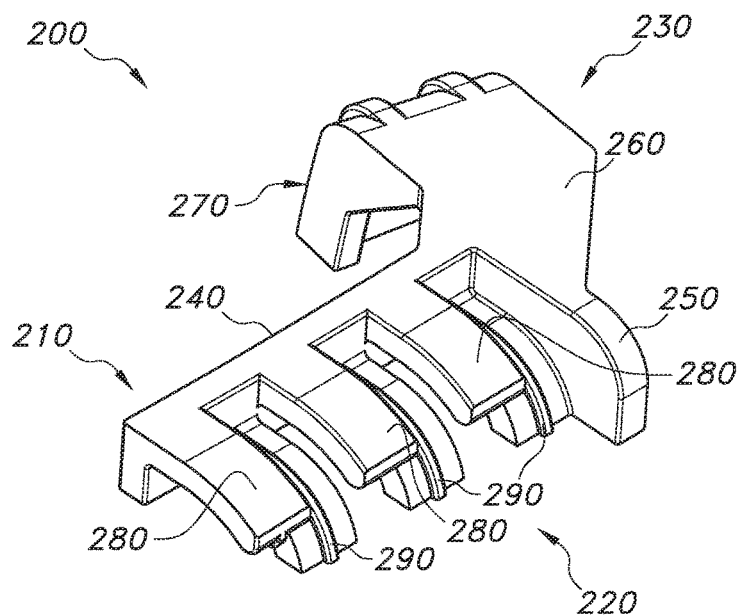
FIG. 2 is a rear isometric view of a pillar trim piece bracket according to the present disclosure.

To solve this and other problems, with reference to FIG. 2 there is provided a pillar trim bracket 200. Certain features of the disclosed pillar trim bracket 200 are described herein according to a direction of motion constrained, i.e. "fore-aft," "up-down," "vertical rotation," "x-, y-, z-axis," etc. It will be understood that these terms are used in the context of a vehicle orientation, i.e. vehicle fore-aft, vehicle up-down, etc.

The pillar trim bracket 200 includes a body 210 carrying a panel- or flange-engaging portion 220 and a trim piece stand-off portion 230. As depicted, the panel- or flange-engaging portion 220 is oriented along a first plane, and the trim piece stand-off portion 230 is oriented along a second plane that is different from the first plane, thereby defining a three-dimensional L-shape.

The body 210 comprises an elongated positioning wall 240 including a positioning rib 250 disposed on a first end thereof, in the depicted embodiment being adjacent the juncture of the body and the trim piece stand-off portion 230. The trim piece stand-off portion 230 comprises a neck 260 carrying a pillar trim piece-supporting head 270. As will be described, the elongated positioning wall 240 controls rotation of the pillar trim bracket 200, and the positioning rib 250 controls fore-aft motion of the pillar trim bracket. The positioning rib 250 likewise prevents potential z-axis rotation of the bracket 200.

The panel- or flange-engaging portion 220 comprises a plurality of spaced and staggered fingers 280 and a plurality of tunable ribs 290 offset therefrom, in combination defining an interference-fit panel receiver as will be described below. In embodiments, the plurality of staggered fingers 280 and a plurality of tunable ribs 290 may each define an arcuate cross-section. The interference-fit panel receiver defined by the plurality of staggered fingers 280/tunable ribs 290 provide a snug interference fit for a panel or flange received therein as will be described below, advantageously without requiring additional mechanical fasteners or adhesives.

Figure 3:
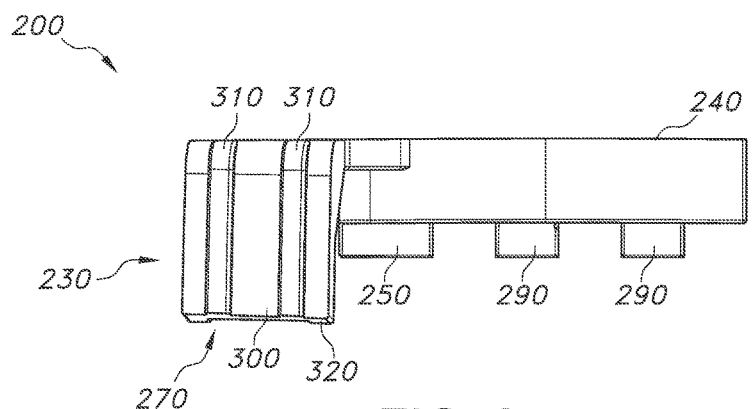
FIG. 3 is a right side view of the pillar trim piece bracket of FIG. 2.

With reference to FIG. 3 the trim piece stand-off portion head 270 defines a pillar trim piece-supporting surface 300 and may include one or more rotation-controlling ribs 310. The trim piece stand-off portion head 270 terminates in an edge 320 configured to matingly abut a pillar trim structural feature (not shown in this view).

Figure 4:
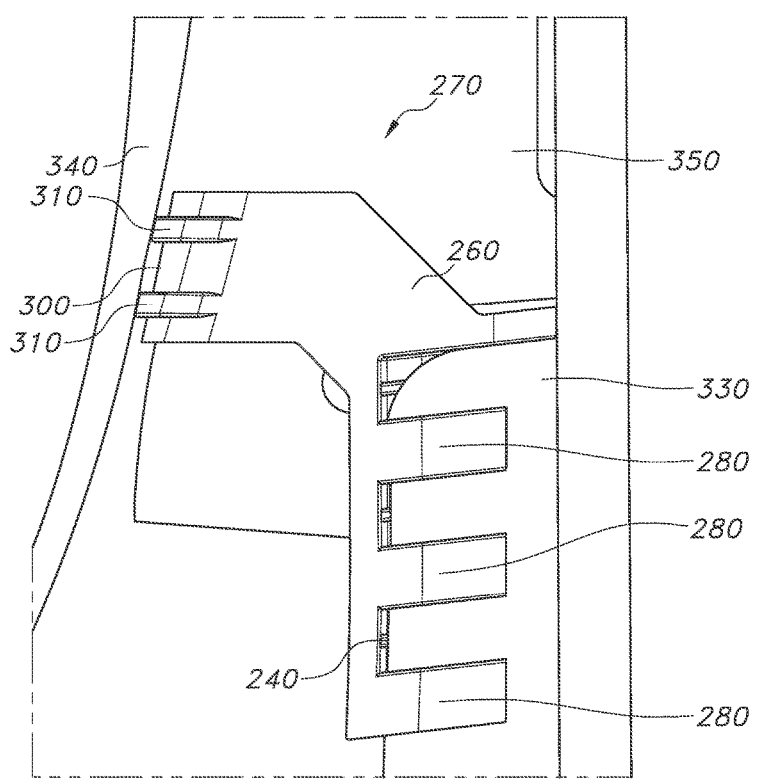
FIG. 4 shows a top view of the pillar trim piece bracket of FIG. 2 in use.

In use, with reference to FIG. 4 the pillar trim bracket 200 engages a vehicle panel or flange 330, for example a portion of the vehicle sheet metal adjacent an A-pillar (not shown) by way of the plurality of staggered fingers 280/tunable ribs 290 (not visible in this view). As described above, the staggered fingers 280/tunable ribs 290 are configured to provide a snug interference fit without requiring additional fasteners or adhesives. The elongated positioning wall 240 abuts an edge of the panel or flange 330, controlling rotation of the pillar trim bracket 200.

In turn, the trim piece stand-off portion 230 abuts and supports a surface of a pillar trim piece 340 as shown by way of the pillar trim piece-supporting surface 300 and one or more rotation-controlling ribs 310, thus controlling up-down motion of the pillar trim piece. The trim piece stand-off portion head 270 edge 320 (not visible in this view) in turn abuts a pillar trim structural feature shown generally as reference numeral 350.

Figure 5:
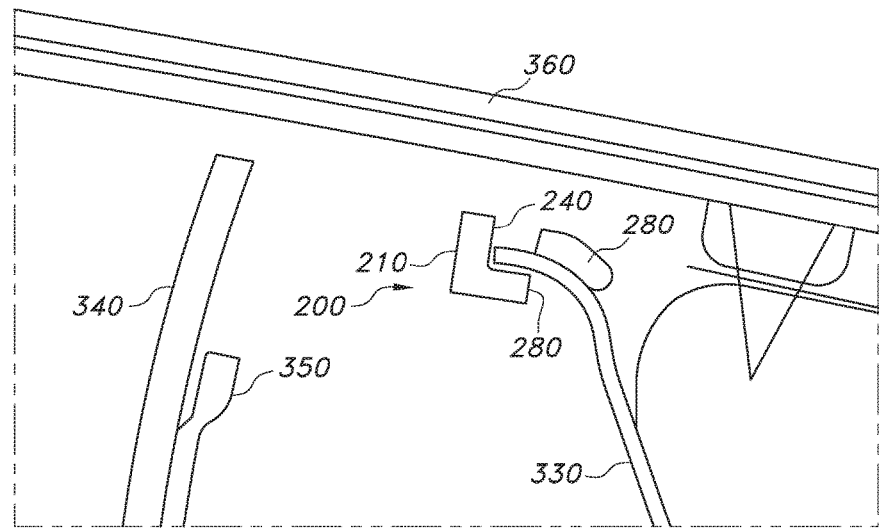
FIG. 5 is a sectional top view of the body of the pillar trim piece bracket of FIG. 2 in use.
Figure 6:
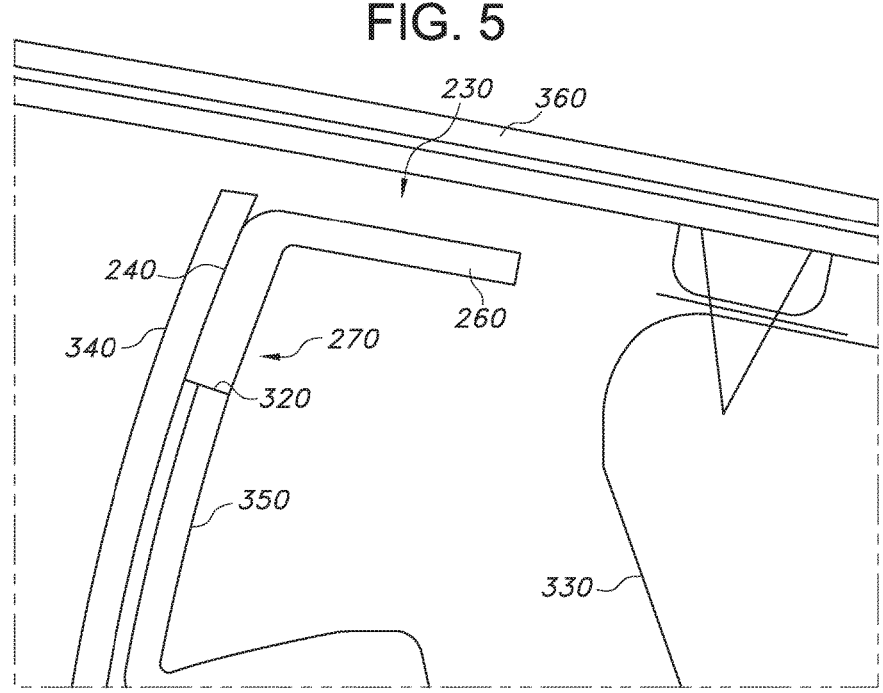
FIG. 6 is a sectional top view of the head of the pillar trim piece bracket of FIG. 2 in use.

This relationship is shown more clearly in FIGS. 5 and 6 depicting the described pillar trim piece bracket 200 in use to support an A-pillar trim piece 340 adjacent a vehicle windscreen 360. As shown in FIG. 5, the staggered fingers 280 carried by the body 210 engage the sheet metal panel or flange 330 in a snug interference fit to provide up-down positional control of the trim piece bracket 200. In turn, rotational control of the trim piece bracket 200 is provided by the arcuate shape of the staggered fingers 280 and the elongated positioning wall 240 abutting an edge of the sheet metal panel or flange 330.

Likewise, as shown in FIG. 6 the trim piece stand-off portion 230 pillar trim piece stand-off portion head 270 pillar trim piece-supporting surface 300 abuts a surface of the A-pillar trim piece 340. In turn, the trim piece stand-off portion head 270 edge 320 abuts an edge of a pillar trim structural feature 350, in the disclosed embodiment being a doubler. By these contact points, rotation and up-down deflection of the trim piece 340 are controlled.

The described pillar trim piece bracket 200 may be fabricated of any suitable material. In embodiments, it is contemplated to fabricate the bracket 200 of a high-heat acrylonitrile butadiene styrene (ABS) plastic for its properties of dimensional stability and structural rigidity at high temperatures.

Numerous advantages accrue by use of the described pillar trim piece bracket 200. The bracket 200 may be molded in separate tooling, eliminating any molding constraints associated with molding stand-off features as part of a pillar trim bracket piece. A relatively simple core-cavity mold can be used to mold the bracket 200, reducing cost.

The three-dimensional L shape defined by the bracket optimizes packaging by making optimal use of available space without impairing structural rigidity of the bracket. Thus, the pillar trim piece bracket 200 can be implemented within the available space between a vehicle pillar and a pillar trim piece, without necessitating re-routing surrounding components such as cables, wiring, hoses, etc. By the described staggered fingers 280/tunable ribs 290, a tunable interference fit is provided to attach the bracket 200 to a panel or flange without requiring additional mechanical fasteners or adhesives. In turn, by altering a height of the tunable ribs 290, the effort required to install the bracket 200 can be adjusted. Likewise, by the tunable ribs 310 provided on the trim piece stand-off portion head 270, the interface to the substrate of the pillar trim piece can be adjusted.

Figure 7:
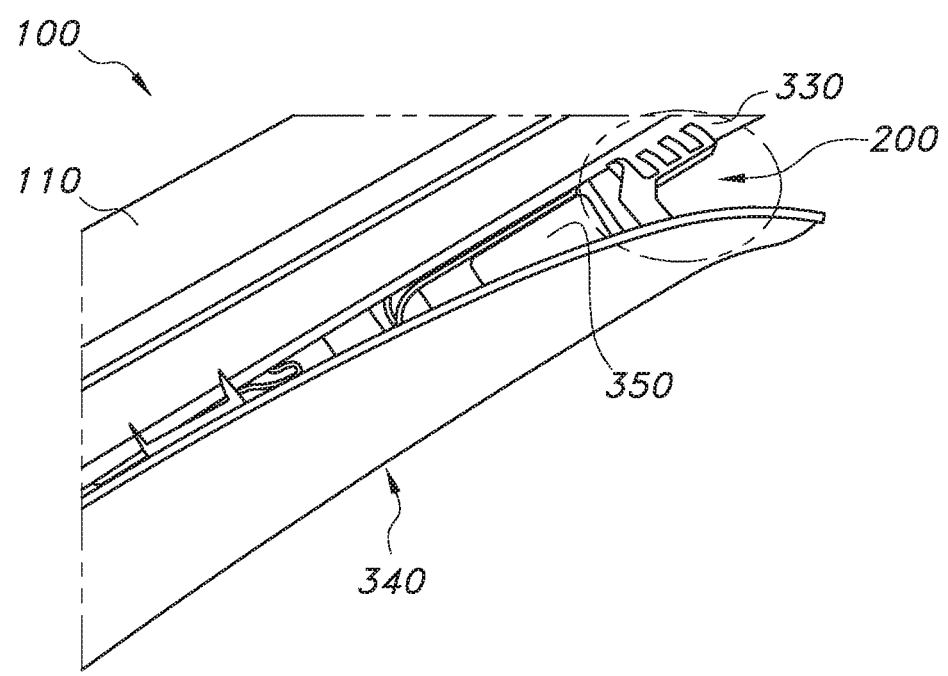
FIG. 7 shows a pillar trim piece bracket according to the present disclosure installed on a vehicle.

The tunable ribs 290/310 provide rotational deflection control for their mating parts. In turn, the trim piece stand-off portion 230 provides up-down deflection control for its mating part as described. Thus, as shown in FIG. 7 by use of the pillar trim piece bracket 200, both up-down and rotational deflection of a pillar trim piece 350 are constrained without need of mechanical fasteners, adhesives, or molded-in stand-off features.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A vehicle pillar trim piece bracket, comprising:
   a panel interference fit receiver comprising an elongated positioning wall carrying a plurality of staggered fingers disposed to receive a panel or flange therebetween, wherein one or more of the plurality of staggered fingers include one or more tunable ribs disposed thereon and further wherein the panel interference fit receiver further comprises a fore-aft positioning rib disposed on a first end of the elongated positioning wall; and
   a trim piece stand-off, comprising a neck and a head defining a pillar trim piece-supporting surface.

2. The bracket of claim 1, wherein the panel interference fit receiver is oriented along a first plane and the trim piece stand-off is oriented along a second plane that is different from the first plane, in combination defining a three-dimensional L shape.

3. The bracket of claim 1, wherein the pillar trim piece-supporting surface further comprises one or more rotation-controlling ribs and an edge configured to matingly about a pillar trim structural feature.

4. The bracket of claim 1, wherein the plurality of staggered fingers each define an arcuate cross-section.

5. A vehicle A-pillar and trim assembly, comprising:
   an A-pillar;
   an A-pillar trim piece; and
   a pillar trim piece bracket, comprising:
      an interference fit receiver for a vehicle panel comprising an elongated positioning wall carrying a plurality of staggered fingers disposed to receive a panel or flange therebetween, wherein one or more of the plurality of staggered fingers include one or more tunable ribs disposed thereon and further wherein the panel interference fit receiver further comprises a fore-aft positioning rib disposed on a first end of the elongated positioning wall; and
      a trim piece stand-off, comprising a neck and a head defining a pillar trim piece-supporting surface.

6. The bracket of claim 5, wherein the panel interference fit receiver is oriented along a first plane and the trim piece stand-off is oriented along a second plane that is different from the first plane, in combination defining a three-dimensional L shape.

7. The bracket of claim 5, wherein the pillar trim piece-supporting surface further comprises one or more rotation-controlling ribs and an edge configured to matingly about a pillar trim structural feature.

8. The bracket of claim 5, wherein the plurality of staggered fingers each define an arcuate cross-section.

* * * * *